US008010886B2

(12) United States Patent
Gusmorino et al.

(10) Patent No.: US 8,010,886 B2
(45) Date of Patent: Aug. 30, 2011

(54) INTELLIGENTLY REPRESENTING FILES IN A VIEW

(75) Inventors: Paul A. Gusmorino, Seattle, WA (US); David Dawson, Seattle, WA (US); Michael J. Gilmore, Bothell, WA (US); Fabrice A. Debry, Seattle, WA (US); Jason A. Christensen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 11/969,654

(22) Filed: Jan. 4, 2008

(65) Prior Publication Data

US 2009/0177962 A1 Jul. 9, 2009

(51) Int. Cl.
*G06F 17/00* (2006.01)
*G06F 3/00* (2006.01)

(52) U.S. Cl. ........ 715/205; 715/234; 715/243; 715/730; 715/762

(58) Field of Classification Search .......... 715/200–208, 715/210, 226, 229, 234, 243, 255, 256, 273, 715/700, 716, 719, 727, 730, 732, 733, 737, 715/760, 762
See application file for complete search history.

(56) References Cited

U.S. PATENT DOCUMENTS

| | | | | |
|---|---|---|---|---|
| 5,760,770 | A * | 6/1998 | Bliss et al. | 715/745 |
| 6,043,817 | A * | 3/2000 | Bolnick et al. | 715/788 |
| 6,925,598 | B2 * | 8/2005 | Melhem et al. | 715/210 |
| 7,075,550 | B2 | 7/2006 | Bonadio | |
| 7,188,319 | B2 | 3/2007 | Amadio et al. | |
| 7,234,114 | B2 | 6/2007 | Kurtz et al. | |
| 2004/0133588 | A1 | 7/2004 | Kiessig et al. | |
| 2004/0225960 | A1 * | 11/2004 | Parikh et al. | 715/517 |
| 2005/0246647 | A1 | 11/2005 | Beam et al. | |
| 2005/0251758 | A1 | 11/2005 | Cummins et al. | |
| 2006/0080269 | A1 | 4/2006 | MacLaurin | |
| 2006/0242585 | A1 | 10/2006 | Cutsinger et al. | |

* cited by examiner

*Primary Examiner* — Maikhanh Nguyen
(74) *Attorney, Agent, or Firm* — Shook, Hardy & Bacon L.L.P.

(57) ABSTRACT

Embodiments of the invention provide a method, system, and media for intelligently presenting representations of files. The method can include determining a set of files for which information about them is to be rendered in a window of a graphical user interface even when not all of the files are the same type, conditioning a format of each representation based on a type of each file, selecting for each representation a set of file properties to be presented (the selection being based on the type of each file), and presenting the set of representations consistent with the formats and with appropriate file properties.

15 Claims, 18 Drawing Sheets

| NAME | DATE MODIFIED | TYPE | SIZE | TAGS |
|---|---|---|---|---|
| ADIPISCING NUNC | 10/19/2005 2:43 PM | MICROSOFT OFFICE WORD 97 -... | 39 KB | ADVERTISING |
| AENEAN MATTIS | 10/19/2005 2:43 PM | MICROSOFT OFFICE EXCEL 97-2... | 30 KB | ADVERTISING |
| AGRICOLA AGRICOLAMUS | 10/19/2005 2:43 PM | MICROSOFT OFFICE POWERPOI... | 15 KB | ADVERTISING |
| FAMES AC TURPIS | 10/19/2005 2:43 PM | MICROSOFT OFFICE EXCEL 97-2... | 32 KB | ADVERTISING |
| GITTARA CLEOPATRA | 10/19/2005 2:43 PM | MICROSOFT OFFICE WORD 97 -... | 39 KB | ADVERTISING |
| IDCIRCO VESTIBULUM | 10/19/2005 2:43 PM | MICROSOFT OFFICE EXCEL 97-2... | 32 KB | ADVERTISING |
| LOGICA VERITAS AGRICOLA | 10/19/2005 2:43 PM | MICROSOFT OFFICE POWERPOI... | 27 KB | ADVERTISING |
| MERCURIUM DESCENDIT | 10/19/2005 2:43 PM | MICROSOFT OFFICE EXCEL 97-2... | 33 KB | ADVERTISING |
| MORBI LACINIA | 10/19/2005 2:43 PM | MICROSOFT OFFICE WORD 97 -... | 39 KB | ADVERTISING |
| NULLA BLANDIT PRETIUM LIGULA | 10/19/2005 2:43 PM | MICROSOFT OFFICE WORD 97 -... | 45 KB | ADVERTISING |
| NULLAM LIGULA IPSUM | 10/19/2005 2:43 PM | MICROSOFT OFFICE EXCEL 97-2... | 27 KB | ADVERTISING |
| NUNC NEQUE TELLUS | 10/19/2005 2:43 PM | MICROSOFT OFFICE WORD 97 -... | 40 KB | ADVERTISING |
| PHASELLUS QUAM NIBH | 10/19/2005 2:43 PM | MICROSOFT OFFICE EXCEL 97-2... | 28 KB | ADVERTISING |

*FIG. 1A. – Prior Art*

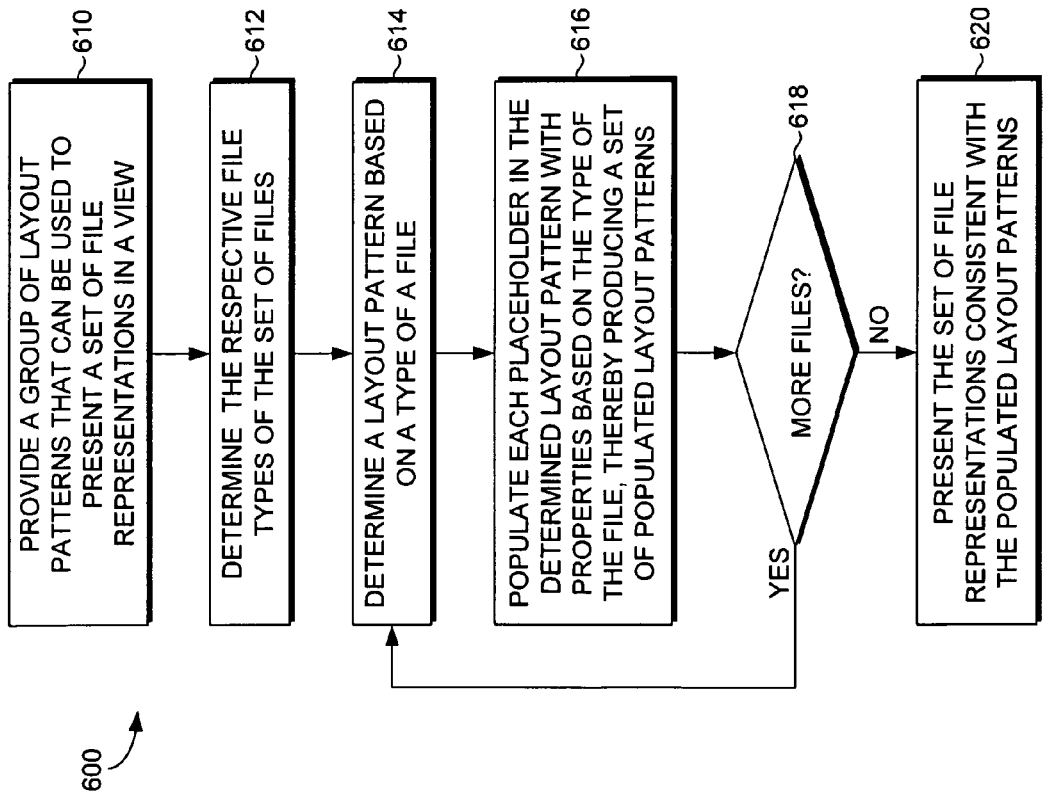

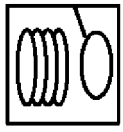
| | | | |
|---|---|---|---|
| You Can't Always Get What You Want | Let It Bleed (1969) | Rock 'n Roll | 7:28 2.77 MB |
| The Rolling Stones | | | |
| Spontaneous Composition Based on Toccata in D Minor (BWV 556) | | | 3:11 |
| Gabriela Montero | Bach and Beyond (2005) | Classical | 6.00 MB |
| This Land is Your Land | | | 3:30 |
| Pete Seeger | We Shall Overcome (1963) | Folk | 2.42 MB |
FIG. 7B.

Lorem Ipsum Strategy Europe 2007 Projects (c:\use... 7/30/2007 10:34 AM consectetur adipisicing elit, sed do eiusmod tempor incididunt ut labore et ...

DRARF – Lorem Ipsum Europe Strategy 2007 Report... 5/2/2007 5:42 PM aute irure dolor in reprehenderit in voluptate velit esse cillum dolore eu fu...

Cross Region Analysis v11 Checkpoint 2 (c:\users\pfor... 3/26/07 1:56 PM occaecat cupidatat non proident, sunt in culpa qui officia deserunt mollit a...

NLC review notes 4-15 Meeting Notes (c:\users\pfor... 4/15/2007 9:50 AM eiusmod tempor incididunt ut labore et dolore magna aliqua. Ut enim ad ...

*FIG. 9B.*

| | | |
|---|---|---|
|  | LOREM IPSUM STRATEGY EUROPE 2007 DIANE DUBOIS-GAGNON  TAGS: COMPLIANCE; SALES; DENMARK | 7/30/2007 10:34 AM 437 KB |
|  | DRAFT – LOREM IPSUM EUROPE STRATEGY 2007 PAT FORADAY | 5/2/2007 5:42 AM 68 KB |
|  | HAWAII VACATION 182 TAGS: FAMILY; BEACH; VACATION ★★★☆☆ 3072x2304 | 7/31/2007 2:12 PM 1.78 MB |
|  | IMG_3453 1200x1600 | 3/8/2004 4:52 PM 723 KB |
|  | SPONTANEOUS COMPOSITION BASED ON TOCCATA IN D MINOR GABRIELA MONTERO  BACH AND BEYOND  (2005)  CLASSICAL | 3:11 6.00 MB |
|  | THIS LAND IS YOUR LAND PETE SEEGER  WE SHALL OVERCOME  (1963)  FOLK | 3:30 2.42 MB |
|  | PAT FORADAY   NONNUMY FUTURE STRATEGY NEW DEVICES ROLL OUT INTERNALTIONALLY LOREM IPSUM REPRESENTS... | 4/27/2007 9:30 PM |
|  | MICHAEL JENSEN   RE: TOO MUCH INVESTMENT IN LOR... THE THEORY BEHIND THE LOREM IPSUM STRATEGY IS THAT LARGE-SCALE... | 4/12/07 3:00 PM |
|  | WIN7 F&O UX TEAM TASKS PRODUCT STUDIO QUERY FILE | 7/11/2007 9:13 AM 2.58 MB |

*FIG. 11A.*

INTELLIGENTLY REPRESENTING FILES IN A VIEW

BACKGROUND

Historically, information about files has been presented in a way consistent with what is shown in FIG. 1A, wherein each file is presented subject to a common set of attributes. For example, the common set of attributes in FIG. 1A consists of a name, date modified, type, size, and tags. Irrespective of the type of file that the different files are, the same aspects of those files are presented across the board. As will be made clear by the instant disclosure, this historical way of presenting data suffers from a variety of shortfalls.

SUMMARY

The invention is defined by the claims below, but summarily, embodiments of the invention include systems and methods for intelligently presenting a view of a set of file representations (e.g., file representations, or even representations of devices such as a printer, mobile phone, network status, etc). that corresponds to a set of files, in which the set of files includes different file types. Each file representation can be tailored to a type of file that it corresponds to such that some file representations include a first arrangement of a first set of properties, but other file types arrange a different set of properties differently. Data can be presented in rows, but not bound to a columnar format.

BRIEF DESCRIPTION OF THE SEVERAL VIEWS OF THE DRAWINGS

Embodiments of the invention are described in detail below with reference to the drawing figures, which form a part of this disclosure, and are incorporated by reference herein, and wherein:

FIG. 1A depicts an illustrative example of presenting information about files in a constrained way;

FIGS. 6A-6C depict illustrative methods for intelligently presenting representations of files according to various embodiments of the invention;

FIGS. 7A-10A depict illustrative examples of layout patterns according to various embodiments of the invention;

FIG. 11A depicts another illustrative example of a view according to an embodiment of the invention.

DETAILED DESCRIPTION

As briefly mentioned, one of the novel aspects of an embodiment of the instant invention includes the ability to present representations of heterogeneous files in a manner that is based on the types of those files. We will describe a variety of other novel aspects of different embodiments of the invention throughout this disclosure. Although we use the term "file" throughout this disclosure, we do not intend for the definition to be so narrow as to only encompass items such as software files. In some embodiments, items are as applicable as files. That is, a view may contain representations of various types of items, some of which include what have been traditionally thought of as files, and others that include things such as peripheral devices, handheld devices, or other items that can be communicatively coupled to a computing system, and that possess properties that are to be displayed.

Figure 2:
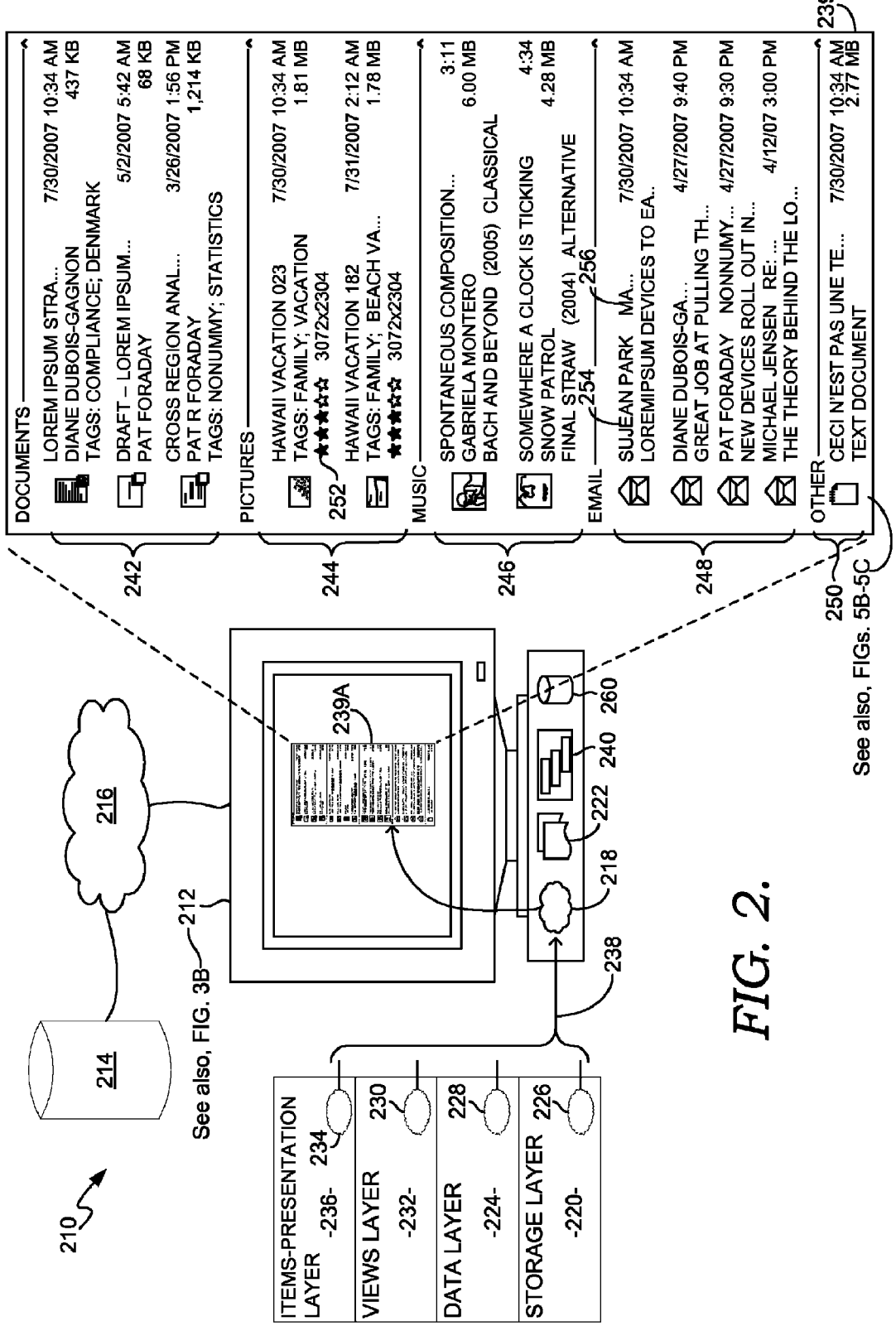
FIG. 2 depicts an illustrative operating environment suitable for practicing an embodiment of the invention.

Turning now to FIG. 2, an illustrative operative environment suitable for practicing an embodiment of the invention is provided and referenced generally by the numeral 210. Operating environment 210 includes a computing device 212 (which will variously be referred to as a computer), which is schematically described in greater detail in FIG. 3.

Figure 3:
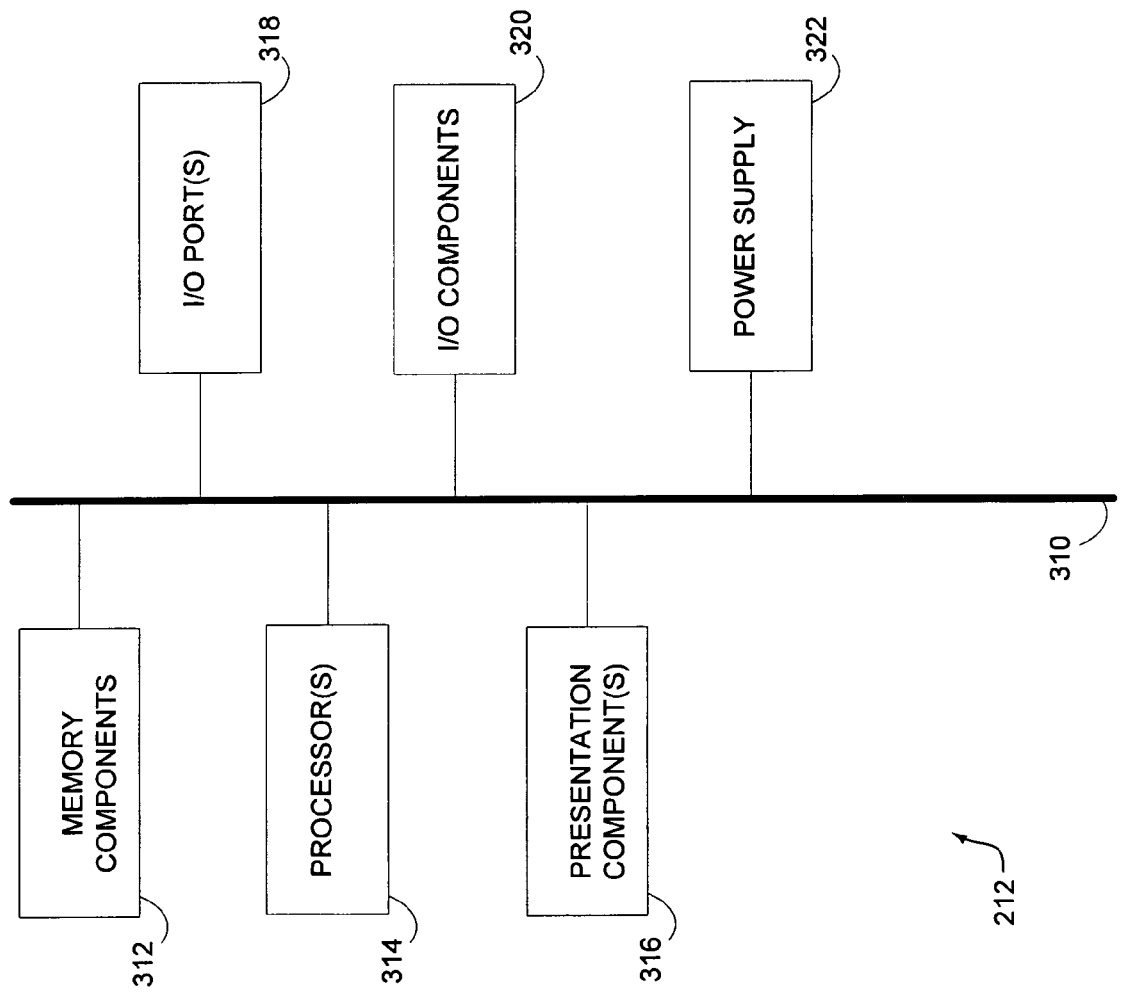
FIG. 3 depicts an illustrative schematic diagram of a computing device according to an embodiment of the invention.

Briefly turning to FIG. 3, a diagrammatic block diagram of computer 212 is provided. Computer 212 may take on a variety of forms, including, for example, a computing device such as a client computer, a server computer, the variations thereof such as laptop computers and palm-top computers, and in some embodiments devices such as PDAs and smart phones. As shown in FIG. 3, a bus 310 couples one or more memory components 312 to one or more processors 314, various presentation components 316, input/output ports 318, input/output components 320, and at least one power supply 322. Other devices including lower level aspects of the shown devices are not shown so as to not obscure the invention.

Memory components 312 include things such as a hard drive, volatile memory (such as RAM), buffers, and the like. The one or more processors 314 control overall data communications throughout computer 212. Illustrative presentation components 316 include a video card as well as a monitor or other presentation device. Input/output ports 318 provide connectivity to peripheral components such as printers, digital cameras and the like. Actual input/output components may be things like printers and the like. A power supply 322 provides power to run computing device 212. Not all of the components shown in FIG. 3 need to be present in order to make up a computing device, but are shown for illustrative purposes in connection with describing an embodiment of the invention.

Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 3 is merely illustrative of an exemplary computing device that can be used in connection with one or more embodiments of the present invention.

Computing device 212 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode desired information and be accessed by computing device 300.

Returning now to FIG. 2, operating environment 210 indicates that computer 212 may be coupled to a remote storage device 214 by way of a network 216, which may actually be one or more networks including a network of networks. Remote storage device 214 may take the form of a network addressed storage device (NAS) or any other form of storage device that is communicatively coupled to computer 212.

An application 218 results in computer 212 being programmed to perform various aspects of various embodiments of the invention. Application 218 may actually be composed of a variety of constituent modules or other programmatic code portions, but is referenced generally herein by the numeral 218 for ease of reference. For example, an embodiment of the invention may take the form of embodied programmatic code that is run in what is known as layers. Four illustrative layers are shown.

A storage layer 220 is a layer in which storage type operations can be provided to effect different aspects of the invention. In some embodiments, storage components reside in storage layer 220. Thus, in one example, a set of data files 222 may reside in storage layer 220. Files 222 may also reside in remote storage component 214, which may also be considered to be a part of storage layer 220. Programmatic code that may help facilitate interaction between storage layer 220 and a data layer 224 is referenced by numeral 226. In some embodiments, code 226 interacts with another portion of code 228, which resides in data layer 224. Those skilled in the art appreciate that what we show as boundaries between the two layers are really gray, fuzzy, and imprecise. We use terminology such as "layers" to describe aspects of the invention that those of ordinary skill in the art will appreciate, but do not mean to self create a precise demarcation that does not exist.

Instructions 228 that reside in data layer 224 interact with another set of instructions 230 in a views layer 232 to help gather the information needed to render a view. We will be using the term "view" often throughout this disclosure. An accurate definition of what we mean by the term "view" can only be gleaned by reading the totality of this disclosure. But summarily, a view is a presentation of representations of data files in a computing environment. We will explain this in greater detail below, but briefly mention this first illustrative definition to help provide some context for the instant discussion of layers. Views layer 232 will work to present a view or a presentation of a set of file representations, and in this embodiment, the file representations are associated with disparate file types. That is, the files represented in a view are not all the same. We will describe this in much greater detail below.

By way of a final illustration, code 230 and views layer 232 interacts with other portions of code 234 in items-presentation layer 236. This code is responsible for at least in part presenting the different items in a view. For example, an illustrative view 239A is shown by way of example of being displayed on computer 212. Blown up for clarity, a depiction of view 239A is referenced by numeral 239B. Seventeen illustrative items are shown in view 239B. Thus, by way of example, items-presentation layer 236 (or that code 234 that will be used by an embodiment of the invention) presents the illustrative items shown in view 239B.

We show the level of granularity that we do regarding programmatic code portions 226, 228, 230, and 234 for referential purposes. These may be roses, and by way of analogy, known by other names to ordinary skilled artisans. We mean to refer to them by way of the functionality offered irrespective of where physically or even abstractly the code portions may reside. Thus, programmatic code 234 may well reside in views layer 232 in some embodiments of the invention, which may even be substantially subsumed in data layer 224 in some embodiments. For ease of reference in the instant disclosure, we intend to imply by bracketed arrow 238 that any code that is used in connection with carrying out the various functional aspects of the invention are subsumed and will be referred to herein by application 218. So even though it may help skilled artisans to understand various aspects of the invention when we speak of views layer 232 interacting with data layer 224 to gather properties of files 222 that are stored in storage layer 220 to ultimately leverage items-presentation layer 236 to present view 239B, we certainly do not mean to limit nor put beyond the scope of the claims below embodiments of the invention that utilize programmatic code that either resides in different layers or is incapable of even being associated with one of the illustrative layers described. What is comparatively more relevant, is the functionality offered by the embodied application 218 to, among other things, present a view such as view 239B, which allows for the display of representations of files that are of different file types in a common bounded graphical user face element such as a window.

As briefly mentioned above, a set of files 222 that are to be the object of a view are embodied on one or more memory components 312. Each of these files is associated with a variety of properties. A set of properties is generally referenced by numeral 240. We will describe properties in greater detail at least with reference to FIG. 5 but also generally throughout the disclosure that follows. Summarily, properties 240 refer to properties of a file.

Illustrative properties include things such as a date associated with a file, an image such as a thumbnail presentation of a file or an aspect of the file, a size of a file, an icon indicating a file type, one or more tags associated with a file (wherein the tags may include audio-tagging information or picture-tagging information), a file preview that indicates a visual representation of content of a file, a name of a file, a type of a file, a custom label associated with a file, rating information that indicates a user rating associated with a file, and/or email information including things such as an indication of a sender, a subject, a date, a priority indication and/or a status indication. The types of things that can be considered a property are legion. The aforementioned list that we provided is not exhaustive by any means, but is provided to convey what we mean by the term.

Figure 5:
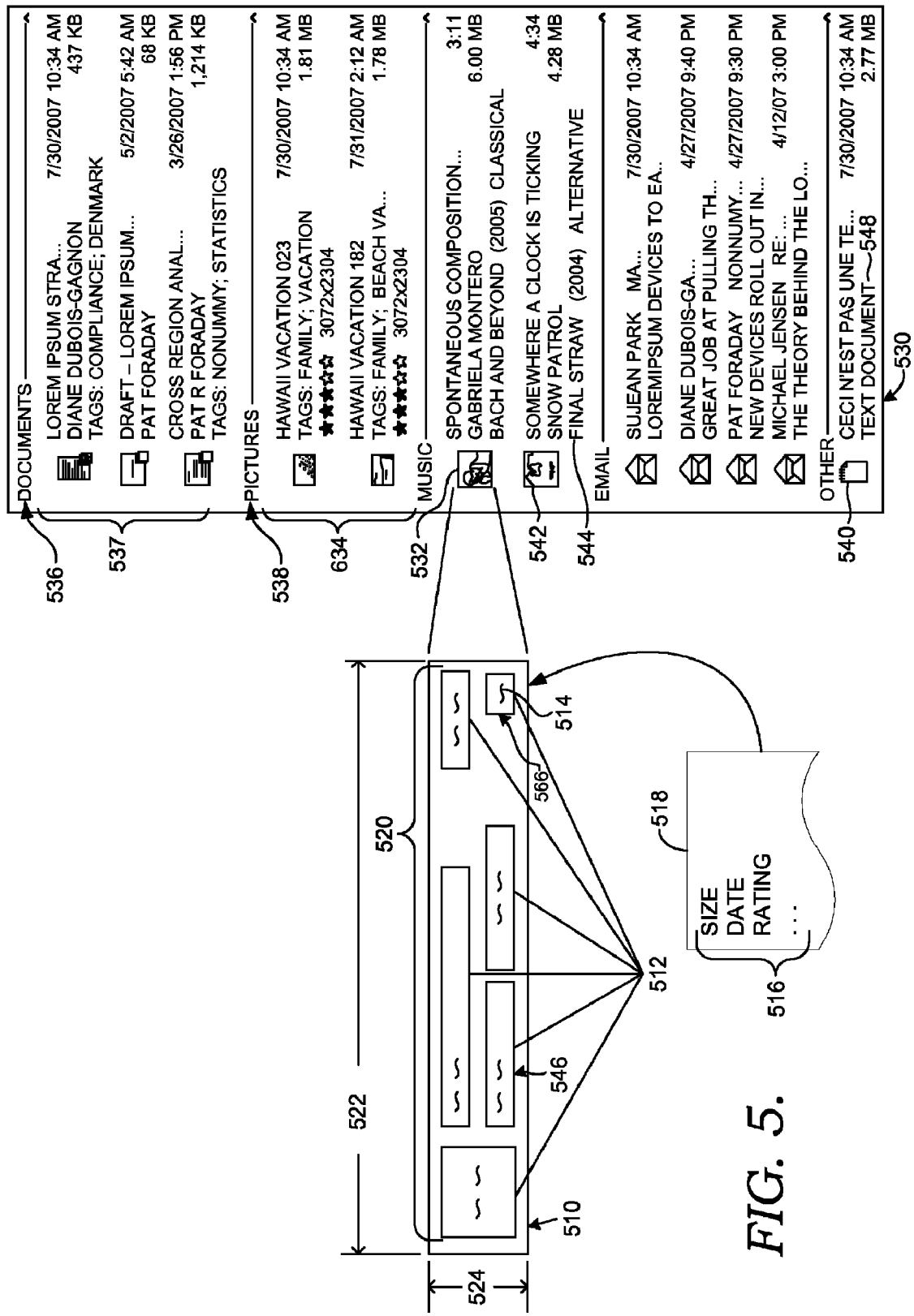
FIG. 5 depicts an illustrative file representation skeleton according to an embodiment of the invention.

We will briefly introduce some aspects of an illustrative view such as view 239B that is capable of being provided by an embodiment of the invention but will also provide additional details in connection with FIG. 5 and various other figures such as from 7A through the end. As shown, four illustrative groups of file types (242, 244, 246, and 248) are shown as well as an additional catch-all grouping that is referenced by numeral 250. Embodiments of the invention employ grouping while others do not. As can be seen at least five different file types are represented by representations in view 239B: documents, pictures, music files, emails, and other types of files such as text files. As can also be seen and as will be described in greater detail below, different properties are displayed for different file types. Moreover, what is displayed is a function of the type of file being represented. For example, some of the pictures include rating information 252. Rating information 252 is not shown in connection with any file in the set of the documents 242. It could be, an embodiment of the invention enables the possibility of presenting certain properties in connection with certain file types but different properties associated with different file types all within the same view. In at least one embodiment, view 239B is not columnar.

As briefly mentioned, files have historically had attributes about them presented in a columnar format such as that shown in FIG. 1A. Although FIG. 1A depicts files that are of a different type, all of the properties are the same. That is, each file is represented by a depiction that includes a name, the date modified, a type, a size, and possibly a set of tags. But presenting data in this manner makes for inefficient reading by users. Moreover, it deprives developers of an opportunity to present properties that are more relevant to certain file types, but not present those same properties in connection with other file types. Further, there is no grouping as well as no headings that are provided in connection with the views that have been traditionally provided.

Returning to FIG. 2, and view 239B, email files 248 include a set of properties that are not even found in connection with the other representations of files. For example, a sender 254 is shown as well as a subject 256. But senders and subjects do not make any sense when representing certain files of other types. That is, they are contextually either irrelevant or undesirable. An embodiment of the invention enables contextually relevant properties to be shown in connection with a single view that contains representations of files of disparate or different file types. We will now describe other aspects of presenting a view as that illustratively shown in FIG. 2.

Figure 4A:
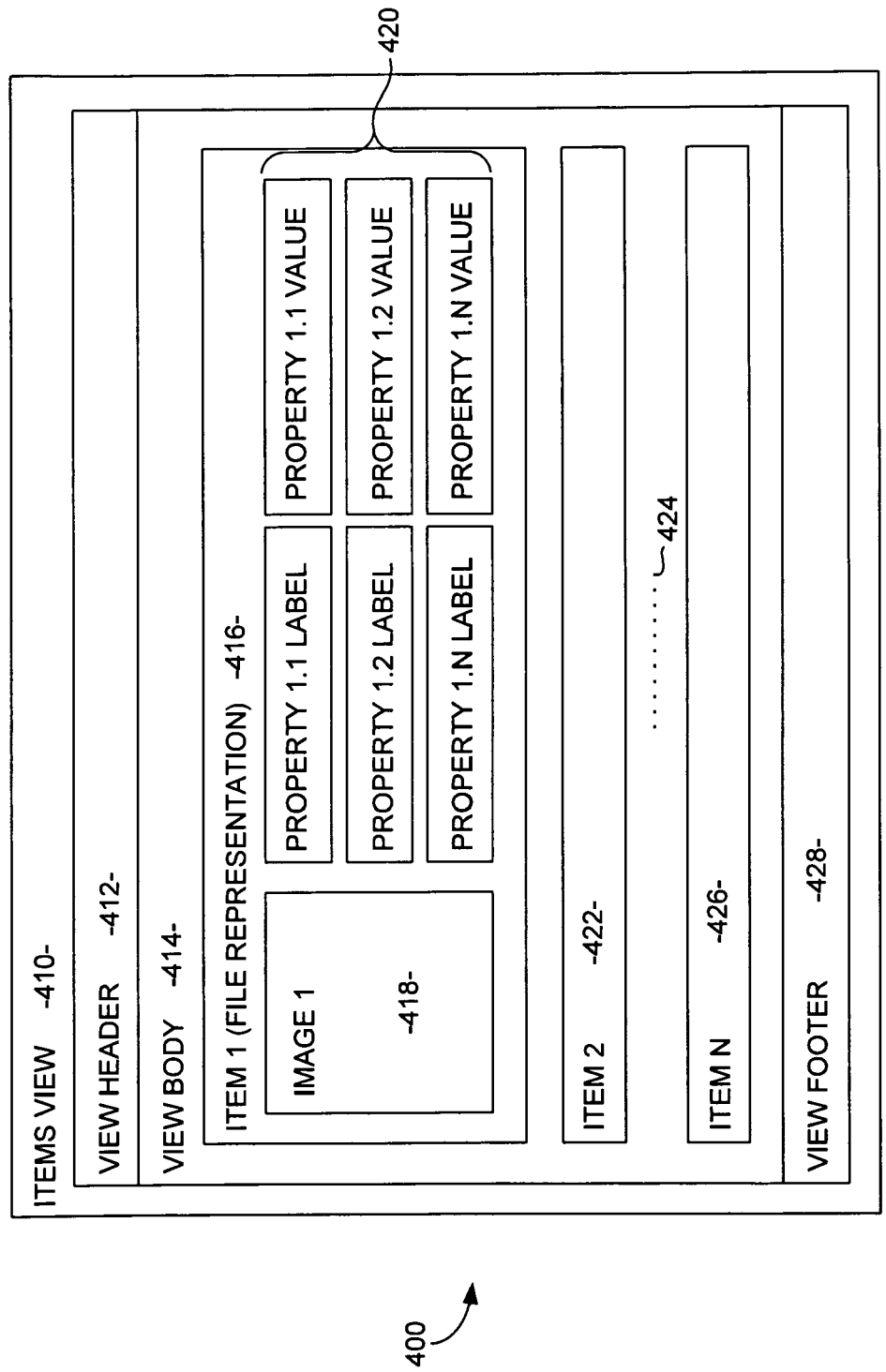
FIGS. 4A-4C depict representations of layouts that are available according to embodiments of the invention.

Turning now to FIG. 4A, a block diagram of a simplified representation of a view is provided and referenced generally by the numeral 400. Representation 400 is illustrative in nature and not intended to be even a generic representation of a way to present all representations of all file types. For illustrative purposes, we describe elements that may make up a view and will describe progressively more complicated elements in connection with FIGS. 4B and 4C. As shown in FIG. 4A the overall view is referenced by numeral 410. Within the overall view, a view header may be used to describe potential properties that might be associated with items in view 410. For example, header 412 may illustratively include things such as a name, a modification date, an indication of a file type, an indication of a file size, as well as an indication of any tags that might be associated with an item. In some embodiments, the view header takes the form of an area along a side, such as the top, of a window that enables users to sort or group items by properties. In other embodiments, header 412 provides a way to access contextual filtering. Users can change, resize, and reorder headings that are displayed. In some respects, header 412 may appear to delineate columns of a view, but the items themselves are not presented in a columnar format in some embodiments. A view body 414 is the main area of view 410 in some embodiments. This is where users may interact with a collection of items (one of which is shown and referenced by numeral 416) as contents of a folder, or of a search query for example.

We will variously refer to items such as item 416 as a file representation. In some contexts it is easier to speak of items, but in other contexts it helps to clarify an item as a representation of a file; namely, a presentation of various properties associated with a file. In some embodiments, item 416 may include an image 418 as well as a set of property labels and/or values 420. As shown, a second item 422 can be presented in body 414 as well as a multitude of items, represented by dots 424, culminating in a last item 426. In some embodiments, a view footer 428 can be included to provide options to users to do certain things such as refine a query or present information associated with the different items in view 410.

Figure 4B:
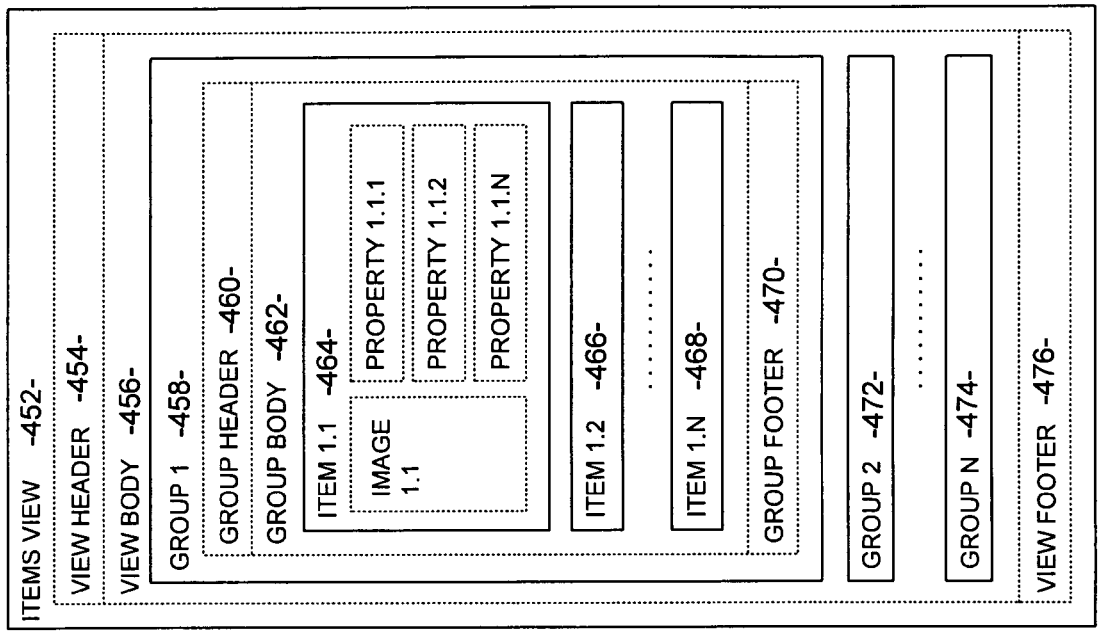

Turning now to FIG. 4B, a more expansive diagram of a view is provided and referenced generally by the numeral 450. This item to view 452 also includes a header 454 as well as a body 456 as previously mentioned in the description of FIG. 4A. But in this embodiment, items can be grouped into groups. Thus a first group 458 is shown as having its own header 460 and a corresponding group body 462, which is composed of a set of items 464, 466, through 468. As previously mentioned, each item 464 includes a variety of properties which may include later data that describes the items such as its name, date modified, etc. Various factors are considered to determine what type of properties will be displayed for a given item. This is one of the novel aspects of the invention and will be described in still greater detail below. Certain properties are displayed in connection with certain file types while other properties are not displayed in connection with certain file types. A group footer 470 might trail the end of each group. Additional groups are also shown, such as a second group 472 through a last group 474. As with view 410, view 452 may end with a footer 476.

Figure 4C:
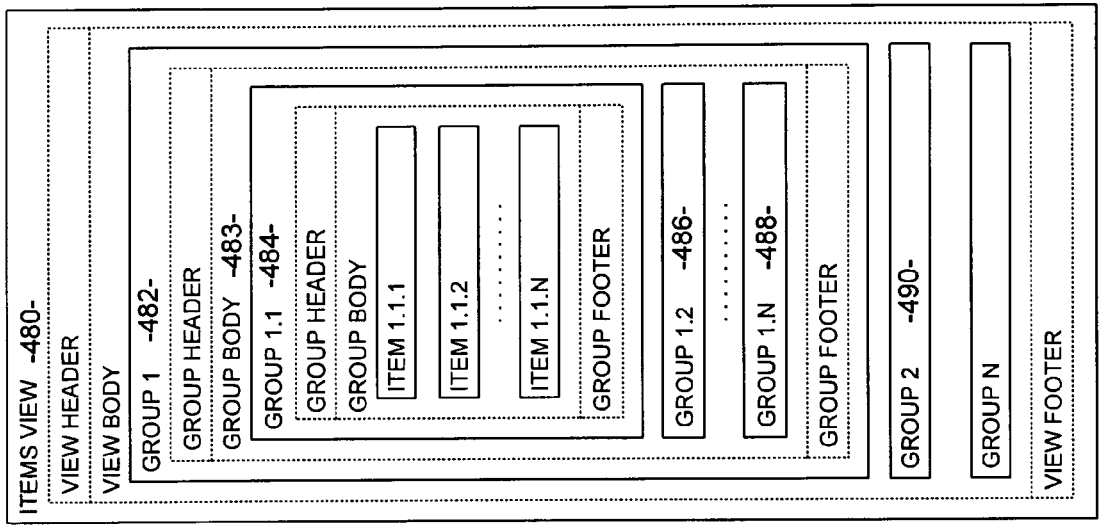

Turning now to FIG. 4C, a still more descriptive view of an embodiment of the invention is provided and referenced by the numeral 478. FIG. 4C again depicts an items view 480 that shows how a group may have subgroups. For example, a first group 482 includes a group body 483 that includes a first subgroup 484 as well as a second subgroup 486 and ultimately a last subgroup 488. View 480 may also include another group 490, which may have subgroups as previously described.

Turning now to FIG. 5, we will describe properties and layout patterns in greater detail. FIG. 5 depicts a file representation 510. File representation 510 includes by way of illustration a set of placeholders that are referenced by numeral 512 that can be populated with data 514, which corresponds to a set of properties 516 of a file 518, which representation 510 represents. The collective arrangement of populated placeholders is referenced by numeral 520. File representation 510 is of a certain dimensional size in some embodiments. That is, it has a certain length 522 and height 524.

When we speak of placeholders, such as placeholders 512, we do not mean to necessarily imply that there are objects (e.g., data 514) present in all file representations that are to be populated. In some embodiments, placeholders may not even be present; but rather serve as an indication of possible properties that can be presented in a view. Not all properties 516 are necessarily used to populate placeholders 512. An illustrative populated placeholder is shown by numeral 546. Although we make a distinction between placeholders 512 and the data (514, 516) that is used to populate those placeholders, we will also refer to a set of populated placeholders as a set of properties because what is ultimately presented in a view is a set of properties. Thus numeral 520 indicates a layout pattern that defines a layout of a set of properties. As will also be described in greater detail below, the size of file representation 510 can vary with the size of a window that is presenting the set of representations.

In addition to the actual positioning of different placeholders, a layout pattern can define specific aspects about how properties to be filled into those placeholders will appear; including, for example, the text color, alignment (left, center, right), and whether or not labels are to be shown.

FIG. 5 is a reproduction of view 239B in FIG. 2, but is shown here and referenced by numeral 530 for ease of reference. An item 532 makes up part of view 530 and is generally shown as having a format that may be a variation of representation 510. Not only may the arrangements of placeholders vary with the size of view 530, but the data that is used to populate even the same placeholders may vary based on one or more of a size of the window in which view 530 is displayed and/or the type of file that file 518 is. As previously mentioned five illustrative groupings of files are shown in this view, being referenced here as view 530. Two of those groupings include a documents grouping 537 as well as a pictures grouping 534. Other groupings not numbered include a grouping of music files as well as email files and other files. Headers are shown that introduce groupings of files in this embodiment. For example, a "documents" heading 536 is shown as well as a "pictures" heading 538.

Consider for example that layout pattern 520 is to be used in connection with displaying at least a set of files of a common file type but, as may be the case in some embodiments, files have different file types (which might also have their own layout patterns) for purposes of illustration. In some embodiments, patterns are selected based on inspecting one or more properties of the items. In other embodiments, patterns are selected based not only on the properties of the items, but also on the context around how the list of items to show was generated. For instance, we will have a different pattern for items resulting from a search (the user typed a search term or invoked a saved search of some sort) than for items received from a browsing type interaction (the user is just exploring the space by navigating from item to item—note that an item can be a container of other items).

Consider two illustrative items for example: a text document 540 and a music file 542. As can be seen, music file 542 includes the name of an album 544 in placeholder 546. But text document 540 includes an indication of file type 548 in placeholder 566. This is an example of how different properties can be presented in the same placeholder based on the type of file 518 being represented by representation 510. As mentioned, 17 file representations are shown. In one embodiment, each representation within a group has the same size. Thus in such an embodiment, all representations 537 of documents have the same size. Similarly, all representations 534 of pictures are the same size. In still other embodiments all of the representations in a single view are the same size. Although the size of each representation may vary with the size of the window, in at least one embodiment, the size of all representations in a common view are the same.

Turning now to FIG. 6A, an illustrative method for practicing an embodiment of the invention is provided and referenced generally by the numeral 600. This illustrative method will be described in connection with FIG. 5 and possibly other figures. In a step 610, a group of layout patterns are provided that can be used to present a set of file representations in a view. By way of example, FIG. 5 showed a single layout pattern 520. We will later describe in connection with FIGS. 7A-10A that a variety of layout patterns may exist.

At a step 610, which may be a preprocessing step, a group of layout patterns are provided that can accommodate various representations of files. To provide a group of layout patterns does not necessarily imply that the layout patterns need to actually exist. Rather, it is enough if application 218 provides the ability to dynamically create layout patterns based on a set of criteria. This method that we are describing is one way of intelligently presenting a view of a set of file representations that corresponds to a set of files in which the set of files include different file types. Thus, in one embodiment, the invention may receive a request to present a representation of a set of files in a folder.

At a step 612, a determination is made as to the respective file types of the set of files in, for example, the folder. Although we say this happens at a step 612, we do not mean to imply a necessary order of the steps of this method. Rather, we are illustrating what will ultimately be accomplished by, for example, application 218. One method of determining the respective file types of the set of files is to inspect the files themselves. Another way of determining the respective file types of the set of files is to examine a data store of data that describes the files. For example, and with reference to FIG. 2, a data store 260, which could also reside on remote data store 214, may be a database of information that describes files 222. In this embodiment, data store 260 (which may take the form of a table or a folder, etc.) will be inspected to determine the respective file types of the set of files to be presented in a view.

An illustrative set of such files could be files 222 as shown in FIG. 2. Another way of determining the respective file types of the set of files is to inspect the files themselves and by identifying the different extensions of each file, learning which types of files are to be presented in the view.

We contemplate distinguishing file types beyond extensions. For example, according to an embodiment of the invention, email received might be considered a different type than a email sent (i.e. received email vs. sent email). In this example, the sender property could be shown on received email versus the recipient property on sent emails. This example makes clear that we are able to determine the "type" using any properties of the files. By way of another illustrative example, the location of the file can be used to determine the type. A file on a network share might show different properties than the same file on the local machine (i.e. "network document" vs. "local document").

At a step or set of recursive steps 614, application 218 determines a layout pattern based on a type of one of the files. If a determination has been made in step 612 as to the different file types, then a layout pattern for each file type can be determined. In an alternative embodiment, the layout pattern can be determined at step 614 based on an inspection of a specific file. Several factors may be taken into consideration in determining a layout pattern. As illustrated in FIG. 6A, the type of file may dictate a pattern selected. The pattern may also be selected by a combination of factors. An illustrative combination of factors includes a file type as well as a size of a window in which to present the set of representations.

At a step 616, each placeholder in the layout pattern selected in step 614 is populated with properties based on the type of file. This produces a set of populated layout patterns. Thus, in step 616, all of the relevant placeholders 512 are populated with the properties 516 that are relevant to the type of respective file. If the file is a music file, then a certain set of placeholders will be populated with a certain set of data. If the file type is a picture, then a different set of placeholders may be populated with a different set of data. If the size of the window is very long, then a certain set of placeholders may be selected for a given file whereas if the size of the window were smaller, then a different set of placeholders would be selected for even the same file. And as previously mentioned, the placeholders may not yet exist. That is, in some embodiments the values are picked and placed in real time without reference to explicit placeholders that actually exist. By "placeholders" we mean to encompass the concept of potential placement of properties subject to a given layout pattern.

If there are more files for which layout patterns are to be selected, then that determination is made at a step 618, and processing reverts to step 614 for that determination to be made if it is being made in real time, or referenced if it had been made in batch. Specific placeholders based at least on the type of file are then populated at a step 616 until there are no more files to have representations presented in the view requested. Without necessarily waiting for all of the above steps to be completed, at a step 620, the set of file representations are presented consistent with the populated layout patterns. In one embodiment, presenting the set of file representations includes arranging the data in a way that it can be outputted through presentation component 316.

In some embodiments presentation component 316 may be a monitor or other display device such that the view is presented on a display device. In an embodiment of the invention the entire process of 600 can be dynamically instituted incident to a user interacting with the files. For example, a user may resize a window containing the representations. As the window is being resized, the arrangement of the layout patterns as well as the specific layout patterns themselves can be varied as the size of the window is varied. In some embodiments, presenting the set of file representations includes grouping those representations according to types of files. In this embodiment, like file types are grouped together. In some embodiments, the file representations are presented in a non-columnar format. As previously mentioned, the file representations might be the same size when being presented in some embodiments.

As mentioned, our system allows for various variables to be set that affect how the placeholders are populated with properties, such as the text color to use, the alignment (left, center, right), and whether or not the property label should be shown or not.

Figure 6C:
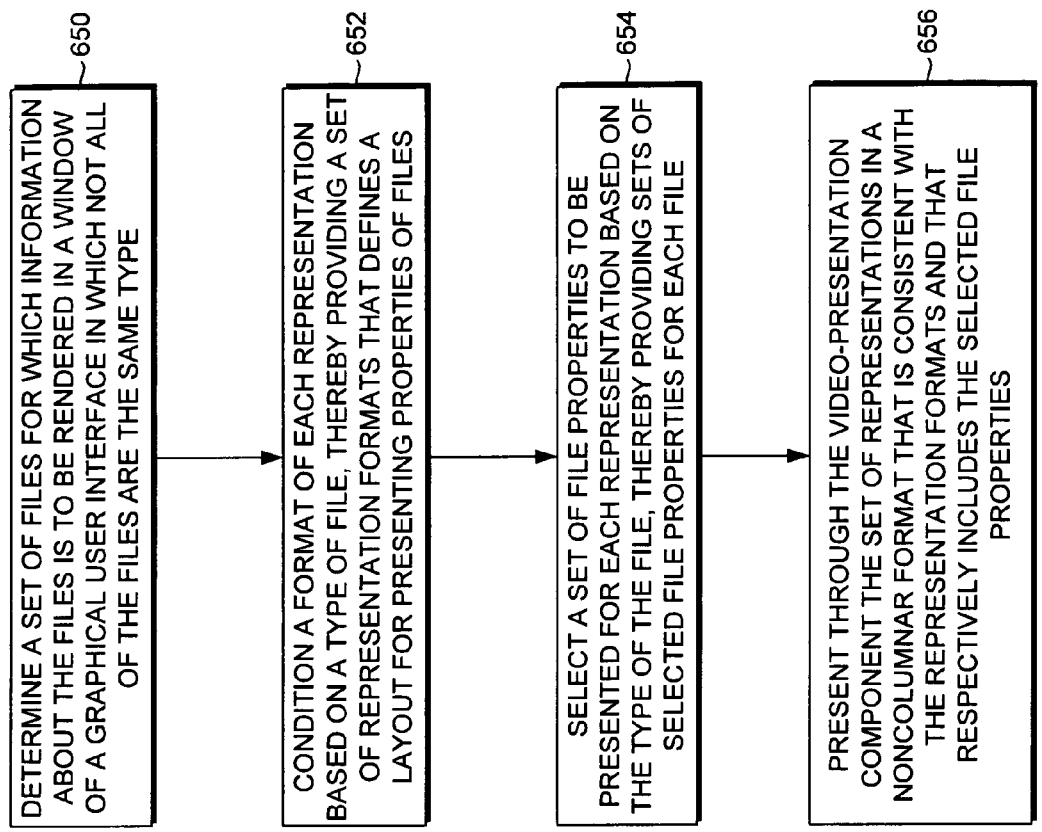
Figure 6B:
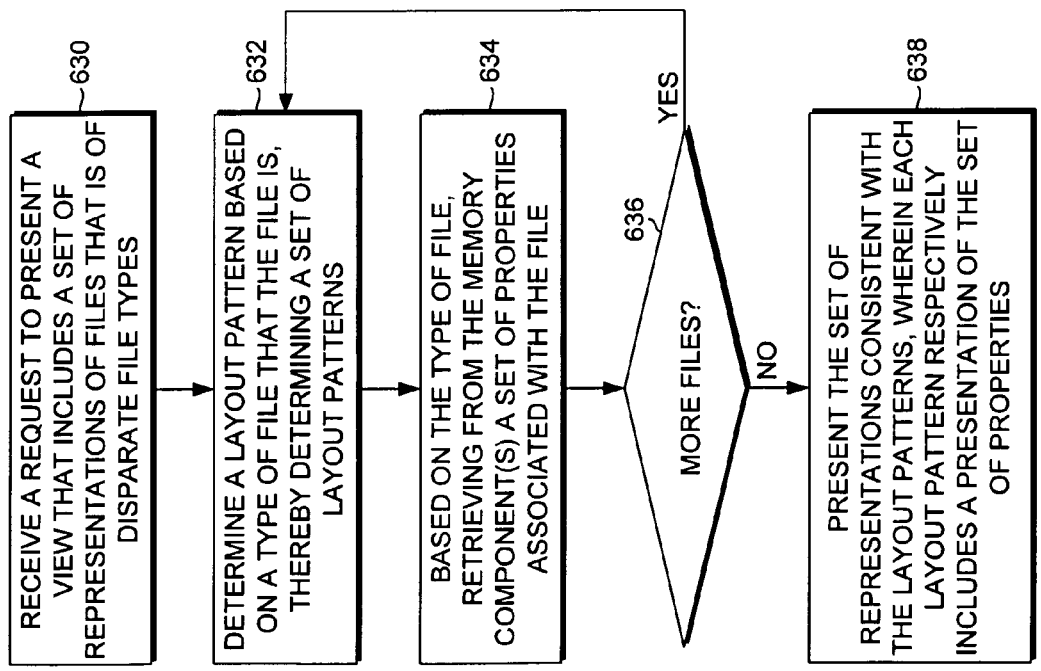

Turning now to FIG. 6B, an illustrative method according to an embodiment of the invention for intelligently presenting a set of representations of files in a bounded screen area is provided wherein some of those files are of different file types than other files. At a step 630, a request is received to present a view that includes a set of representations of files that are of disparate file types. For example, a user may desire to inspect the contents of a folder that have been presented in a window. In one embodiment, application 218 will receive this request to present information about the files at a step 630. At a step 632, and for a given file, a layout pattern 520 will be determined based on a type of file that the file is. This will produce a set of layout patterns.

As previously mentioned, the different layout patterns differ with file types. In other embodiments, the types of file patterns may vary based on the type of action engaged in. For example, a browse request may implicate a different layout pattern than a search request even though the information about the same files will be presented. As we have also previously mentioned, other factors may also be included to determine a layout pattern. Illustrative other factors include a size of a window that will be used to present representations of the files or folders.

Although we illustratively show a loop sort of processing, various steps of FIG. 6B, as well as the other figures, may be performed in different orders, in tandem, or in batch. Thus, in one embodiment, layout patterns can be determined for each file at step 632. In other embodiments, a layout pattern for a single file can be determined, with processing advancing to a step 634, wherein based on the type of file, a set of properties associated with the file (i.e., file 518) are retrieved from one or more memory components 312. Thus, certain properties may be retrieved in connection with certain types of files, whereas other properties may be retrieved in the case of other types of files. Embodiments of the invention are flexible enough to accommodate selective retrieval of properties of files based on the types of files of which information is being sought. Again, in some embodiments the steps of 632 and 634 are more serial in nature, but in other embodiments a batch or even out-of-order processing scheme is employed.

At a step 636, a determination is made as to whether there are additional files about which information is desired. If so, then processing reverts to step 632, but if not then processing advances to a step 638 where the set of representations is presented in a manner that is consistent with the layout patterns that were determined at a step 632. In this embodiment, each layout pattern respectively includes a presentation of the specific set of properties that are associated with each file representation to be presented. As previously mentioned, we do not mean to imply in FIG. 6B that step 638 does not begin until step 632 and/or 634 complete. That is, we do not mean to imply that no files are presented until information such as layout patterns or properties are determined for all files. To the contrary, embodiments of the invention contemplate scenarios wherein data will begin to be presented asynchronously.

That is, as layout patterns and types of files are chosen, corresponding representations of those files can be presented without waiting for such information to be determined for all files. Also as previously mentioned, the types of layout patterns can be modified on the fly, such as when a user resizes the window. If a user decides to resize a window, then the set of representations will possibly take on alternative layout patterns, which will be described in greater detail in connection with FIGS. 7A-10A.

An illustrative example of a result of FIG. 6B is shown in FIG. 5, in which it can be seen that files of different file types have different layout patterns as well as properties 516 populated in view 530. Whereas it may be the case that the size of the file representations (e.g., length 522 and height 524) are common across all file representations in view 530, in other embodiments the file representations may take on different sizes with respect to either file types, or even property values. Thus, it may be the case that document file representations 537 take on a layout pattern 520 of a first size, whereas pictures representations 534 take on a layout pattern 520 of a different size. It may also be the case, that different properties or placeholders take on different sizes either with respect to each other or with respect to representations of different file types. Briefly referring to FIG. 12A by way of example, it can be seen that the picture images are represented by thumbnails, namely larger thumbnails than the thumbnail representations of the documents or emails. We will discuss FIG. 12A in greater detail below.

Turning now to FIG. 6C, another method for more intelligently presenting representations of files is provided. At a step 650, a set of files is determined for which information about the files is to be rendered in a window of a graphical user interface in which not all of the text files are the same. With reference to FIG. 2, computer 212 possesses the ability to render a graphical user interface, which can include a window to present information about a set of files of interest to a user or other. In some embodiments, a user may request that the contents of a folder be presented. In other embodiments, a user may request that a search be performed across the various storage components accessible by computer 212.

At a step 652, application 218 in one embodiment conditions a format of each file representation 510 based on the type of the corresponding file 518, thereby providing a set of representation formats that each define a layout for presenting properties 516 of the file. We have previously described various ways of conditioning a format of file representation 510. In one way, the format may include a first layout pattern 520. Alternatively, the format may include a different layout pattern, such as the multitude of layout patterns that we are about to discuss in connection with FIGS. 7A through 10A. In other embodiments, instead of or in addition to changing a layout pattern, a format of representation 510 may include a first set of properties 516. In another format, different properties 516 may be included. In this embodiment, the format of file representation 510 is conditioned based on the type of file that file 518 is. Different file types may lead to different formats of file representation 510, which is an illustrative generic representation of any of the different file representations shown on FIG. 5.

At a step 654, a set of file properties is selected to be presented for each representation based on the type of file that file 518 is. This provides a set of selected file properties for each file. Again, this need not happen in a serial fashion. Different properties can be selected based on file type. With knowledge of a format and a set of properties, application 218 can present through video presentation component 316 the set of representations in a noncolumnar format that is consistent with the representation formats and that respectively includes the selected file properties from step 654. Thus, an output such as view 239B from FIG. 2 may be provided by way of step 656. The set of representations (242, 244, etc.) are presented in a noncolumnar format. Moreover, the representations are consistent with the formats and include various properties based on the types of each file that each representation corresponds to.

Figure 7A:
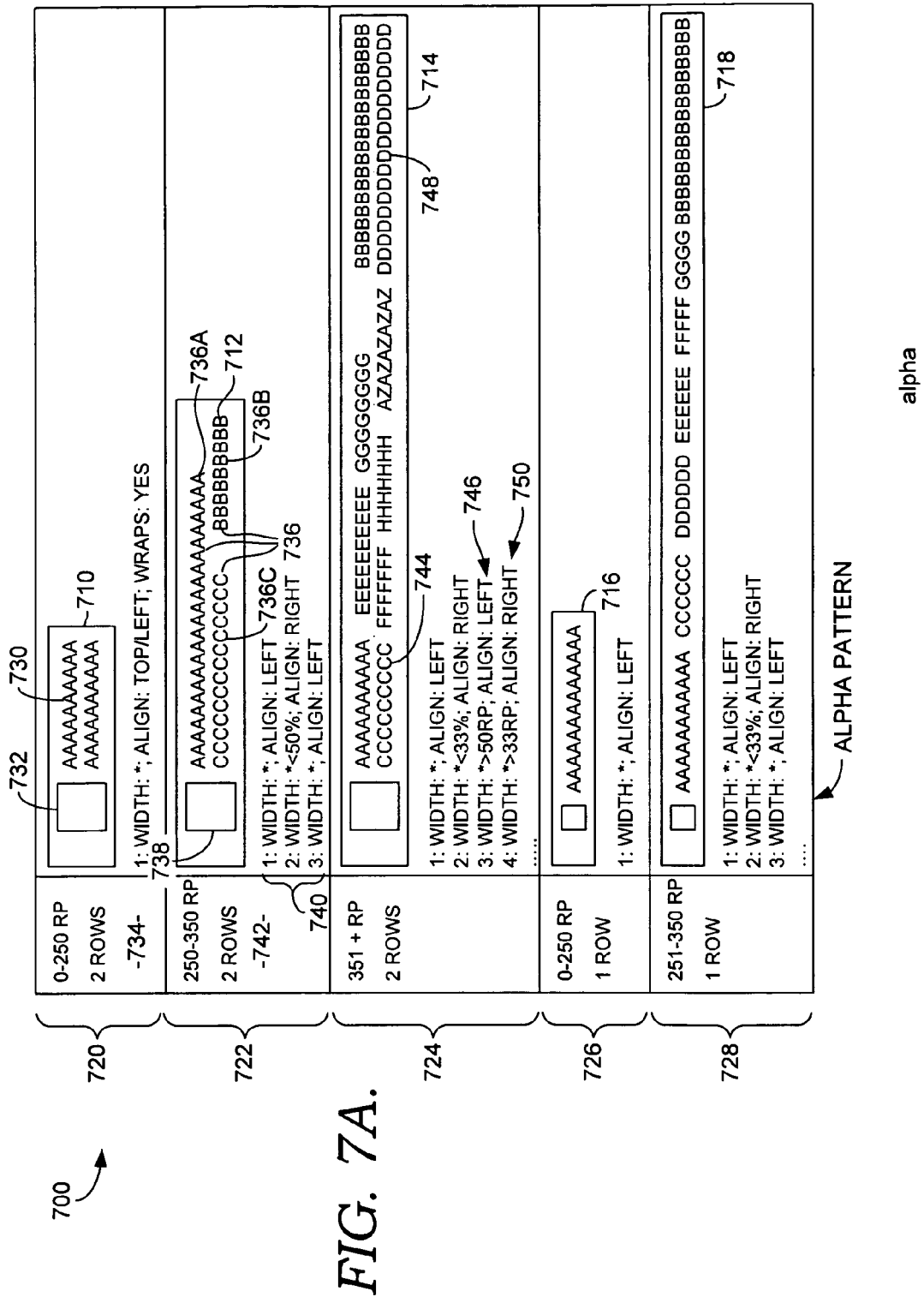

Turning now to FIG. 7A, an illustrative layout pattern, as well as many variations thereof, is provided and referenced generally by the numeral 700. To make reference easier, we will refer to this layout pattern as alpha pattern 700. Alpha pattern 700 is shown to illustratively include five layout patterns, which are respectively referred to by numerals 710, 712, 714, 716, and 718. Information corresponding to these patterns are provided in respective rows 720, 722, 724, 726, and 728. Individual items or properties of each pattern are referenced by a series of letters. For example, and with reference to row 720, layout pattern 710 is shown to include two properties: a thumbnail 732 and another property 730 represented by a string of As. As indicated in 734, item layout pattern 710 is a pattern that would be applicable to a window that includes zero to 250 relative pixels (RP) and is an item layout pattern that includes two rows.

With reference to column 722, it can be seen that item layout pattern 712 shows three properties 736 as well as a thumbnail 738. Attributes of each of the properties are referenced by numeral 740. With reference to attributes 740, it can be seen that the first property 736A can have a variable width and left alignment. Further, attributes 740 indicate that a second property 736B is to consume not more than 50% of the width of layout pattern 712 and be right aligned. The third property 736C is to be left aligned as further shown by legend 740. Cell 742 indicates that item layout pattern 712 is applicable to having 250-350 relative pixels available, and when two rows are desired.

Turning to row 724, which is applicable to 351 or more relative pixels and by way of further illustration two rows, is shown to be able to accommodate nine different properties, which are referenced by a set of letters ranging from As to Js. Selectively choosing some of the properties for illustrative purposes, the third property 744 is defined by line 746 to be applicable more than 50 relative pixels are available and to be left aligned. By way of further illustration, fourth property 748 is to not consume more than 33% of the width of item layout pattern 714 and is to be right aligned as is shown by row 750. These illustrations help to explain the vast ranges of options, which are almost infinite, that can be employed to present data in a way not allowed by the prior art. If a developer determines that only a single row is to be used, then the developer can provide an item layout pattern as is shown in row 726, which is applicable to up to 250 relative pixels, but only shows one row of data. A final illustrative example is shown by way of row 728, which constrains item layout pattern 718 to a single row, that is applicable to situations where more than 251 relative pixels are available.

In some embodiments, this pattern, alpha pattern 700 represents a single pattern layout that can take on various forms based on the size of a window that is being used to present different file representations. Many hundreds of layout patterns can be defined, and various formats or subpatterns of those patterns can further be defined based on an amount of screened real estate available to present the file representations. By way of example, a developer may elect to apply alpha pattern 700 to music files. In such a situation, all music files will be subject to alpha pattern 700. That is, based on the screened real estate available, one of the options (710-718) will be selected for all music files. Similarly, a developer may associate only text files or some other files that meet certain criteria and are to be associated with alpha pattern 700. By way of example, representation FIG. 7B depicts an illustrative representation of files according to alpha pattern 700. But a developer may wish to utilize some different pattern, which has a different arrangement of placeholders.

Figure 8A:
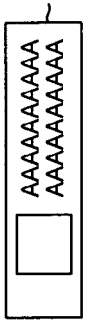

Another illustrative layout pattern is shown in FIG. 8A and is referenced by numeral 800. For ease of reference, we will refer to this as beta pattern 800. Beta pattern 800 is shown to illustratively include seven item layout patterns which are referenced by numerals 812, 814, 816, 818, 820, 822, and 824. Reading the table shown in FIG. 8A is similar to that of FIG. 7A; thus, less detail will be provided so as to not be repetitive. By way of a few illustrations, row 826 shows that item layout pattern 816 can display four properties as well as a thumbnail. First property 828 was not to consume more than 33% of item layout pattern 816 and is to be right aligned as indicated by line 830 of legend 832. The other property formats can be gleaned from legend 832. Cell 834 indicates that layout pattern 816 is desirable to be used when 351 to 450 relative pixels are available and two rows of data are desired to be shown.

An understanding of the seven illustrative item layout patterns that make up beta pattern 800 can be understood by referencing FIG. 8A. As previously mentioned, a developer may desire to have certain types of files associated with beta pattern 800 instead of alpha pattern 700. In such a case, instead of items being laid out according to alpha pattern 700, the file representations of a view would be laid out according to beta pattern 800. Illustrative layouts of beta pattern 800 can be seen in FIGS. 8C-8E.

Figure 8C:
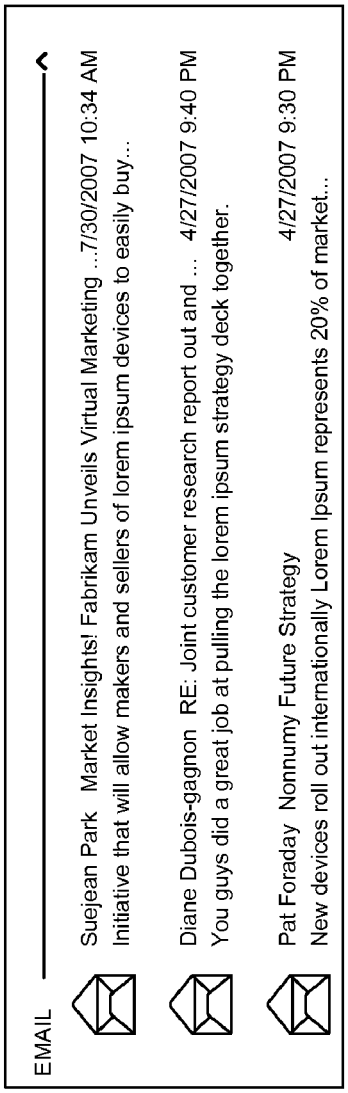
Figure 8E:
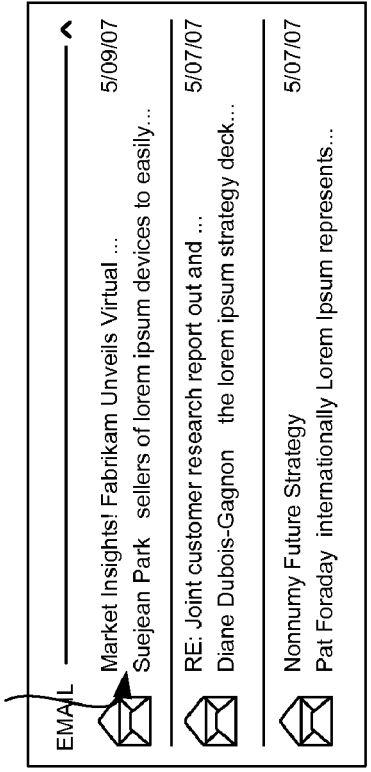

For example, FIG. 8C depicts a representation of a first variation of beta pattern layout 800. If the window size of FIG. 8C is narrowed, then a window such as that of FIG. 8E may occur. As can be seen from FIG. 8E, intelligence has been provided according to the item layout patterns of FIG. 8A. That is, more is happening than just reducing the maximum sizes of the property fields that were available in FIG. 8C. By way of illustration, the sender property 810, which used to appear in the first row, has been moved down to location 812 in the second row (as can be seen by referencing FIG. 8E). Many different types of layouts or populations of placeholders can be used and conditioned upon file type and/or screened real estate.

Figure 9A:

FIG. 9A depicts another illustrative layout pattern, which we will refer to as gamma pattern 900. If we were to continue to use the alphabet to list different illustrative patterns, we would run into the doubles and triples, quadruples, etc. sets of letters. What we show as a final illustration just is to drive home the point that many different layout patterns could be created to potentially be used to display file representations.

Gamma pattern 900 illustratively shows six different item layout patterns as with the two previous examples of FIGS. 7A and 8A. In the example of gamma pattern 900, the specific properties are shown to be arranged differently in some instances than those corresponding item layout patterns of alpha or beta pattern. For example, consider row 910, which describes item layout pattern 912 with item layout pattern 816 as described in row 826 of FIG. 8A. In item layout pattern 816, four properties were shown. But in gamma pattern 900, item layout pattern 912 includes only the first three properties rather than attempting to show the fourth. That is, item layout pattern 912 shows three attributes, whereas item layout pattern 816 shows four even though both are applicable to situations where 351 to 450 relative pixels are available. FIG. 9B depicts a representation of a set of file representations according to gamma pattern 900.

Figure 10A:
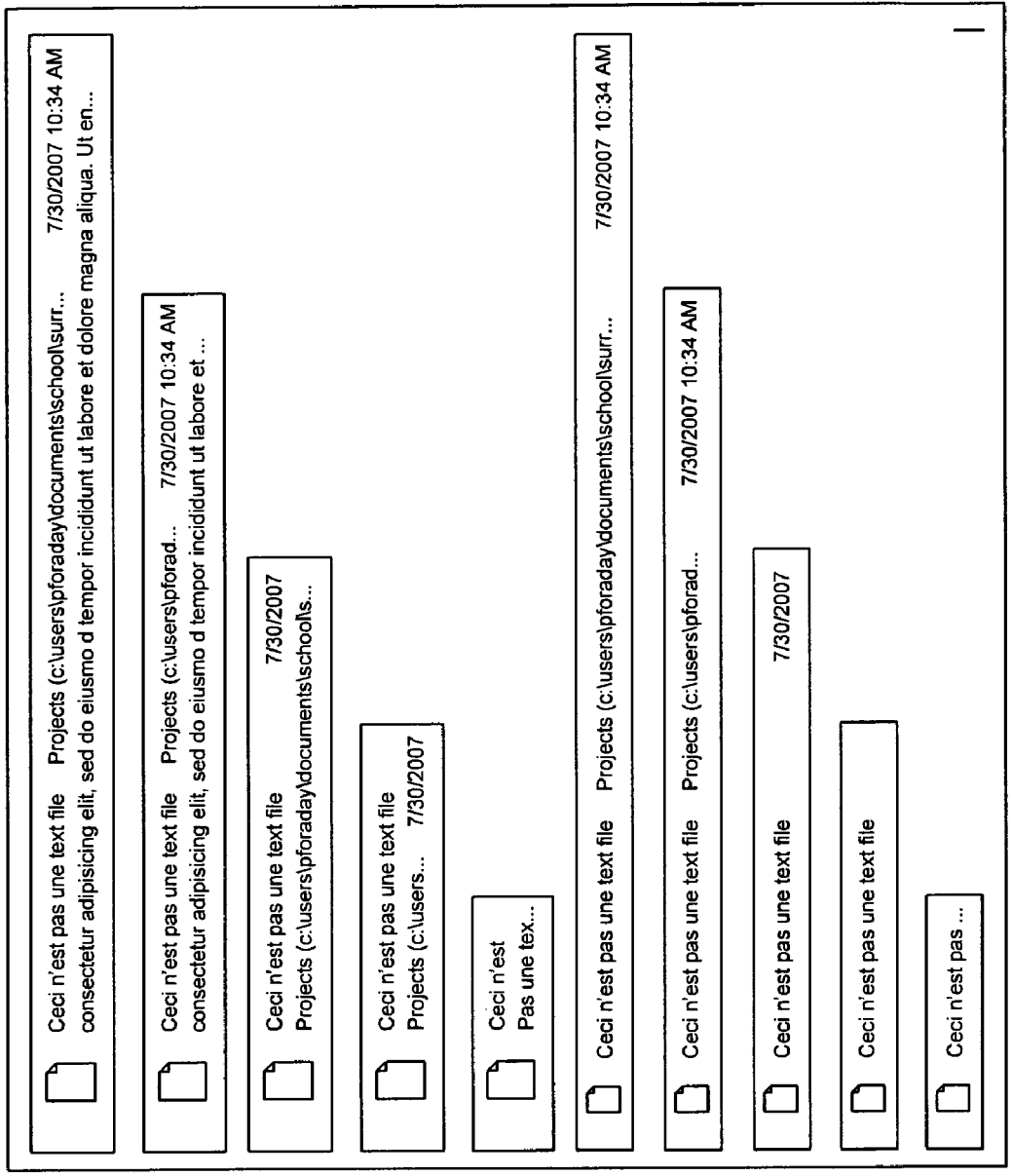

FIG. 10A was provided to show still more examples of how a content and arrangement of a layout pattern can be varied as the size of the different layout patterns themselves are varied. FIG. 11A shows still another illustrative example of a possible view rendered according to an embodiment of the invention. As can be seen, various thumbnail images or icons having various sizes can be shown. Moreover, files of different file types include different information even though, in this embodiment, each of the different file representations are of the same size.

Figure 12A:
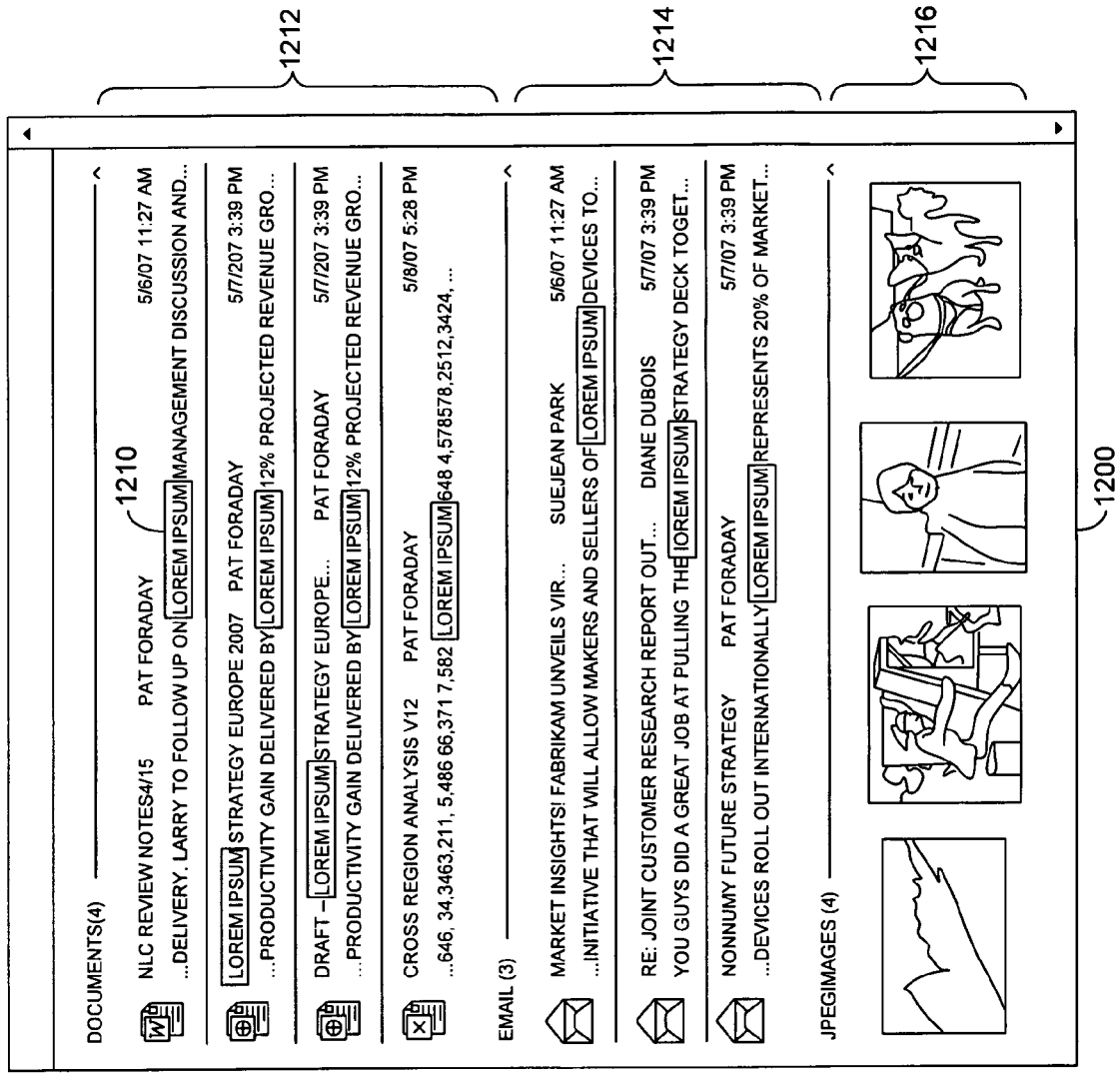
FIG. 12A depicts an illustrative example of the fruits of a search query according to an embodiment of the invention.

Turning now to FIG. 12A, it indicates a view that is the fruit of a search request. In this example, the phrase "lorem ipsum" is the subject of a query, wherein the various file representations shown in FIG. 12A are presented in window 1200. As was previously mentioned, it may be the case that the representations shown in screen 1200 might be of a different arrangement or include different properties than the exact same files that would have been presented in a window had they not been the subject of a search. Thus, embodiments of the invention are flexible enough to accommodate presenting the exact same data in different ways if so desired.

In the example shown, some sort of marker 1210 is provided that indicates the search term. In the illustrative example, marker 1210 takes the form of an outline around search terms, but can also take the form of bolding the search term, highlighting the search term, etc. As shown in this illustrative example, all of the four documents 1212 are grouped separately from the set of emails 1214, and stay separately from the pictures 1216. As can also be seen, the representations of the pictures are of a different size than the representations of the other files, illustrating an aforementioned aspect of an embodiment of the invention.

Different modes of displaying file representations can be presented according to embodiments of the invention. For example, a list mode could list a set of file representations in one long list. In another embodiment, a tiles mode could tile representations in a grid-like fashion. Embodiments of the invention are also not limited to a pure two dimensional scheme.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for intelligently presenting a view of a set of file representations that corresponds to a set of files, in which the set of files includes different file types, the method capable of being performed by a computing device that has access to one or more memory components storing the set of files, and the method comprising:

providing a plurality of layout patterns that can be used to present the set of file representations in the view,
(1) wherein each layout pattern is defined by an arrangement of a set of placeholders,
(2) wherein each placeholder of the set of placeholders is capable of presenting a property of a file type,
(3) wherein each placeholder is to be populated based on the file type, and
(4) wherein the arrangement is based on the file type, such that at least some arrangements associated with some file types are different than other arrangements associated with other file types;

determining the respective file types of the set of files; and for each file,
(1) determining a layout pattern based on a type of the each file, and
(2) populating each placeholder in the determined layout pattern with properties based on the type of the each file, thereby producing a set of populated layout patterns; and presenting the set of file representations consistent with the populated layout patterns, wherein the properties presented in the populated layout patterns are a function of the type of the each file being represented.

2. The method of claim 1, wherein the set of placeholders initially do not contain any information.

3. The method of claim 1, wherein the property of a file type includes at least one selection from the following:
a date associated with the file;
an image, such as a thumbnail presentation;
a size of the file;
an icon indicating the file type;
one or more tags associated with the file, wherein the tags may include audio tagging information or picture tagging information;
a file preview that indicates a visual representation of content of the file;
a name of the file;
a type of the file;
a custom label associated with the file;
rating information that indicates a user rating associated with the file; and
email information, including one or more of a sender, a subject, a date, a priority indication, and a status indication.

4. The method of claim 1, wherein determining the layout pattern is further based on a size of a bounded area that contains the set of file representations such that the arrangement of the set of placeholders varies with the size.

5. The method of claim 1, wherein populating each placeholder is further based on a size of a bounded area that contains the set of file representations such that the content of the set of placeholders varies with the size.

6. The method of claim 1, wherein presenting the file representations includes outputting a presentation to a display device.

7. The method of claim 6, wherein presenting the file representations includes presenting the file representations in a noncolumnar format.

8. The method of claim 7, wherein presenting the file representations includes grouping representations of like file types together, thereby providing a plurality of groupings of representations, wherein each grouping may contain one or more representations, and wherein each representation in each of the plurality of groupings of representations is a common size.

9. The method of claim 1, wherein said layout pattern defines aspects about how properties to be filled into said placeholders will appear, wherein said properties includes one or more of:
   text color,
   alignment, wherein the alignment is at least one of left alignment, center alignment, or right alignment, and whether or not labels are to be shown.

10. One or more computer-storage media having computer-executable instructions embodied thereon that when executed by a computing device having a processor and memory, cause the computing device to perform a method of intelligently presenting in a window of a graphical user interface (GUI) a set of representations of files in which some files are different types than other files, and wherein the files are stored on one or more memory components, the method comprising:
   providing, by way of a computing device having a processor and memory, a plurality of layout patterns that can be used to present the set of file representations in the view,
      (1) wherein each layout pattern is defined by an arrangement of a set of placeholders,
      (2) wherein each placeholder of the set of placeholders is capable of presenting a property of a file type,
      (3) wherein each placeholder is to be populated based on the file type, and
      (4) wherein the arrangement is based on the file type, such that at least some arrangements associated with some file types are different than other arrangements associated with other file types;
   determining the respective file types of the set of files; and
      for each file,
         (1) determining a layout pattern based on a type of the each file, and
         (2) populating each placeholder in the determined layout pattern with properties based on the type of the each file, thereby producing a set of populated layout patterns; and
   presenting, by way of the computing device, the set of file representations consistent with the populated layout patterns, wherein the properties presented in the populated layout patterns are a function of the type of the each file being represented.

11. The media of claim 10, wherein the file types are determined based on differing file extensions.

12. The media of claim 10, wherein the layout pattern initially does not include data placeholders.

13. The media of claim 10, wherein presetting the set of representations includes presenting the set in a bounded portion of the GUI.

14. The media of claim 13, further comprising resizing at least a subset of the representations in response to a varying of a dimension of the bounded portion of the GUI.

15. The media of claim 13, further comprising dynamically rearranging at least some of some layout patterns in the set of layout patterns in response to a varying of a dimension of the bounded portion of the GUI.

* * * * *